Aug. 22, 1933.  E. H. BROWN, JR  1,923,967
COMBINED VISE AND CHUCK HOLDING BLOCK
Filed March 3, 1932  2 Sheets-Sheet 1

Inventor
E. H. Brown, Jr.
By Clarence A. O'Brien
Attorney

Aug. 22, 1933.  E. H. BROWN, JR  1,923,967
COMBINED VISE AND CHUCK HOLDING BLOCK
Filed March 3, 1932  2 Sheets-Sheet 2
Fig. 3.
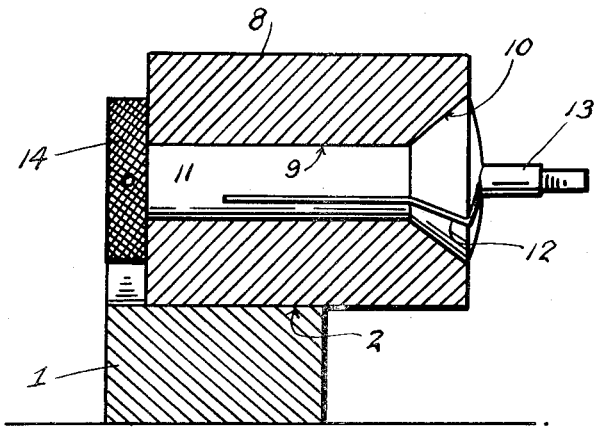
Fig. 4.
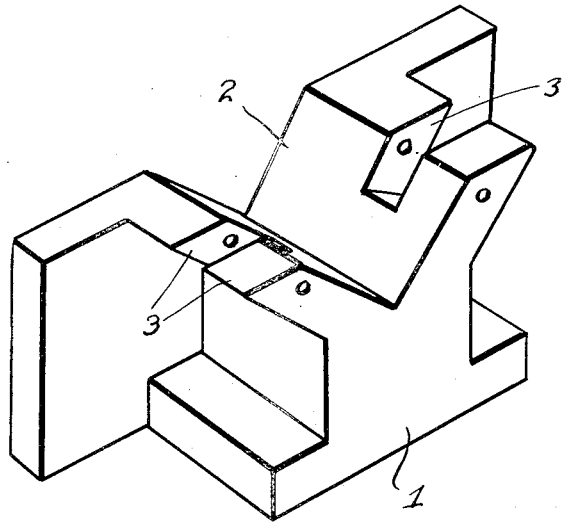
Fig. 5.
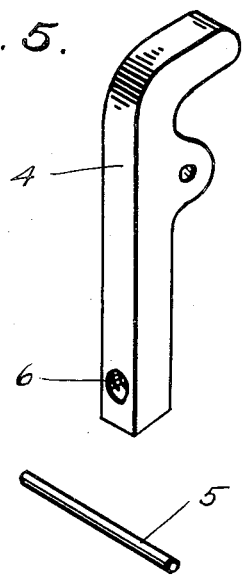
Fig. 6.
Inventor
E. H. Brown, Jr.
By Clarence A. O'Brien
Attorney Patented Aug. 22, 1933

1,923,967

UNITED STATES PATENT OFFICE 1,923,967

COMBINED VISE AND CHUCK HOLDING BLOCK

Eugene H. Brown, Jr., Troy, N. Y.

Application March 3, 1932. Serial No. 596,647

1 Claim. (Cl. 90—59)

This invention relates to a combined vise and chuck, the general object of the invention being to provide a vice having a V-shaped recess therein and a rectangular-shaped block, either right angle part of which is adapted to fit in the recess, with a collet or chuck removably held in the block for holding a member which is to be operated on.

This invention also consists in certain other features of construction and in the combination and arrangement of the several parts to be hereinafter fully described, illustrated in the accompanying drawings and specifically pointed out in the appended claim.

In describing the invention in detail reference will be had to the accompanying drawings wherein like characters denote like or corresponding parts throughout the several views, and in which:—

Fig. 3 is a section on line 3—3 of Fig. 2.

Fig. 4 is a perspective view of the clamp or vise body.

Fig. 5 is a view of one of the clamping jaws.

Fig. 6 is a view of the pivot pin for a jaw.

Figure 1:
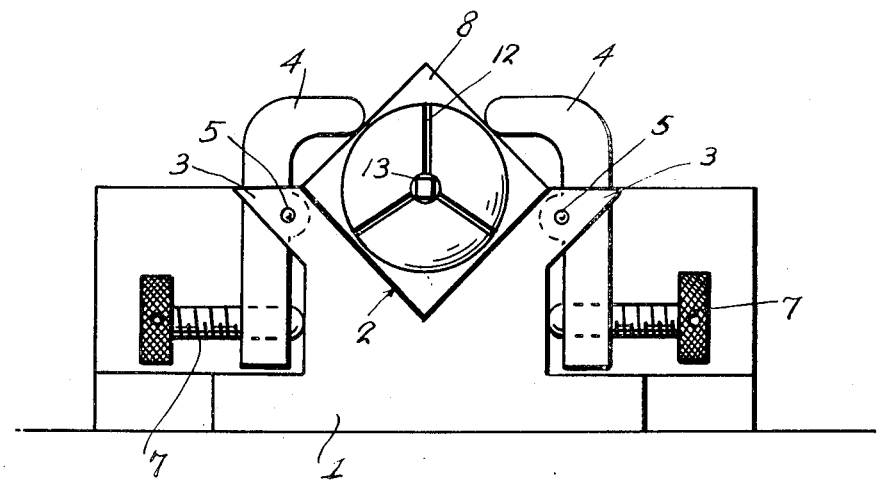
Figure 1 is an elevation of the invention showing the same in horizontal position.
Figure 2:
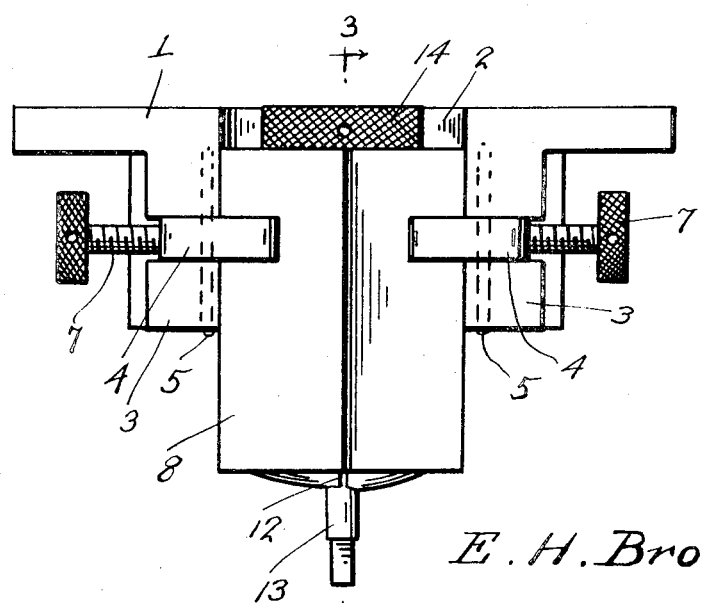
Fig. 2 is a top plan view of Fig. 1.

In these drawings, the numeral 1 indicates the body of the vise which is formed with a V-shaped recess 2, the walls of which are formed with notches 3 to receive the shanks of the jaws 4 which are pivoted in the notches by the pins 5. These jaws are substantially L-shaped as shown, and the ends of the shanks or the long arms thereof are formed with threaded holes 6, for receiving the screws 7, the turning of which adjusts the jaws to cause their short arms to hold the block 8 in the recess 2.

As shown this block is of rectangular shape so that either one of its right angled parts can be placed in the recess and then by turning the screws 7, the short arms of the jaws will engage the outer portions of the block so as to hold it in the recess. The block is formed with a bore 9 having a flaring end so that when a collet or chuck such as shown at 11 is placed in the bore, the head of the collet will engage the flared part as shown in Fig. 3. This collet is provided with slits 12 which divide the major portion of the collet into three portions so that the work piece or the like, shown at 13 can be placed in the bore of the collet and then by placing the collet in the chuck block and tightening the nut 14 on the rear end of the collet, the three portions of the collet will be caused to grip the member 13 so that the same will be firmly held in the block while the block is firmly held in the vise.

With the device arranged as in Fig. 1, the vise can be clamped on the face plate of a lathe so that the work piece can be indicated to run absolutely true, or the vise can be placed in a vertical position with the block resting on the nut 14, so that the work piece will be in a vertical position.

This vise and block could be used in numerous operations by tool makers and mechanics and different sizes of collets may be used in the block.

The device can be used in centering round work of different sizes or for halving and quartering by turning on either of the four right angled sides of the block. It can also be used in a vertical position and be ground absolutely true inside and out making it accurate for machining tools or the like, that have to be fluted on four sides, halved, or singled, such as counterbores, taps, and various shapes of cutters for different uses, also round pieces may be held in proper position to be drilled through the center.

As will be seen, the block is made up of a square piece with hole to meet required size of the body and taper of collet used. The nut is used to draw in collet on taper, to grip any shape stock required. The clamping vise can be used to hold various shapes of objects such as square, round, hexagonal and flat stock, and the vise can be placed on any of its right angle sides, assuring quick and accurate method of laying out or machining work desired.

As will be seen, the device is so designed that four sides are at right angles, therefore making it possible to support the vise on any one of the four sides, and the V-shaped recess at right angles to two of the sides makes it possible to center square, round, or flat stock of various length in lathe by clamping the vise to face plate of the lathe.

This vise with its flat sides with V recess at right angles, enables the operator to get different shaped objects at right angles to be machined either in vertical or horizontal position.

The block is used in combination with the recess in the vise for a new and improved method of draw in chuck whereby this improvement will greatly improve truing and centering work to be machined on face plate of the lathe.

Clamping vise has all right angle sides and work of different shapes may be clamped to any of said sides by use of parallel clamps or something similar for holding work at right angles.

Different ways of machining is accomplished on drill press, surface grinder, milling machine, shaper or lathe.

Chuch block assembled in clamping vise as shown in Fig. 1, can easily be turned on either of its four sides, thus enabling operator to divide work, firmly held in collet to be machined square, flat or fluted either in lathe or milling machine. One may also obtain correct settings for a double or quadruple thread by turning block chuck in recess of vise.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

In means for the purpose described and in combination, a body having therein a seat with right angularly related faces, a block of rectangular form in cross section arranged in said seat and between said faces of the body, means for detachably holding the block in said seat, and a chuck secured in the longitudinal center of said block.

EUGENE H. BROWN, JR